United States Patent
Chern et al.

(10) Patent No.: US 8,342,297 B2
(45) Date of Patent: Jan. 1, 2013

(54) VEHICLE BRAKING ASSEMBLY WITH REDUCED SQUEAL

(75) Inventors: Jim Chern, Troy, MI (US); Ronald Alan Smith, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/426,750

(22) Filed: Mar. 22, 2012

(65) Prior Publication Data

US 2012/0175199 A1 Jul. 12, 2012

Related U.S. Application Data

(62) Division of application No. 12/417,603, filed on Apr. 2, 2009.

(51) Int. Cl.
*F16F 7/10* (2006.01)
*F16D 65/38* (2006.01)

(52) U.S. Cl. ............... 188/73.37; 188/73.35; 188/73.36; 188/379

(58) Field of Classification Search ............... 188/73.35, 188/73.36, 73.37, 218 R, 218 XL, 250 E, 188/379, 378
See application file for complete search history.

(56) References Cited

U.S. PATENT DOCUMENTS

| | | |
|---|---|---|
| 3,295,647 A | 1/1967 | Murphy |
| 3,307,669 A | 3/1967 | Klinkenberg |
| 3,368,654 A | 2/1968 | Burnett et al. |
| 3,428,155 A | 2/1969 | Binder et al. |
| 3,687,244 A | 8/1972 | Hillegass et al. |
| 3,866,977 A | 2/1975 | Rice |
| 4,043,431 A | 8/1977 | Ellege |
| 4,139,995 A | 2/1979 | Lamarche |
| 4,291,786 A | 9/1981 | Ito |
| 4,475,634 A | 10/1984 | Flaim et al. |
| 4,523,666 A | 6/1985 | Murray |
| 4,715,485 A | 12/1987 | Rostin et al. |
| 4,796,728 A | 1/1989 | Kanengieter et al. |
| 4,867,284 A | 9/1989 | Okamura et al. |
| 5,099,962 A * | 3/1992 | Furusu et al. ............... 188/73.37 |

(Continued)

FOREIGN PATENT DOCUMENTS

EP 03186787 7/1989

(Continued)

OTHER PUBLICATIONS

Leissa and Chern, Closed Form Exact Solutions for the Forced Vibrations of Rectangular Plates, Pan American Congress of Applied Mechanics, 1991, pp. 710-713.

(Continued)

*Primary Examiner* — David Dunn
*Assistant Examiner* — Philip Gabler
(74) *Attorney, Agent, or Firm* — Raymond L. Coppiellie; Just Intelectuals, PLLC (57) ABSTRACT

The present disclosure relates to a vehicle braking assembly with reduced squeal, having: a brake pad operative to apply a braking force to a brake rotor or drum, the brake pad being subject to vibration during braking; and a damper attached to the pad, configured to force a squeal reducing vibration in the brake pad, the damper including: (i) a first mass; (ii) a second mass connected to the first mass by a first shaft; and (iii) a third mass connected to the first mass by a second shaft.

7 Claims, 10 Drawing Sheets

U.S. PATENT DOCUMENTS

| | | | |
|---|---|---|---|
| 5,139,117 A | 8/1992 | Melinat | |
| 5,415,062 A | 5/1995 | Kohno et al. | |
| 5,666,862 A | 9/1997 | Eckel et al. | |
| 5,746,292 A * | 5/1998 | Tanaka et al. | 188/73.37 |
| 5,823,304 A | 10/1998 | Wagg | |
| 5,855,257 A | 1/1999 | Wickert et al. | |
| 6,112,865 A | 9/2000 | Wickert et al. | |
| 6,164,423 A | 12/2000 | Dickerson | |
| 6,286,639 B1 | 9/2001 | Uhlig | |
| 6,467,590 B2 | 10/2002 | Aydt | |
| 7,032,723 B2 | 4/2006 | Quaglia et al. | |
| 7,159,703 B2 | 1/2007 | Fukushima | |
| 7,163,095 B2 | 1/2007 | Springer et al. | |
| 7,195,111 B2 | 3/2007 | Fukushima | |
| 7,401,690 B2 | 7/2008 | Lazowski et al. | |
| 2006/0219500 A1 | 10/2006 | Lu et al. | |
| 2006/0266599 A1 | 11/2006 | Denys et al. | |
| 2007/0056815 A1 | 3/2007 | Hanna et al. | |
| 2007/0062768 A1 | 3/2007 | Hanna et al. | |
| 2007/0117640 A1 | 5/2007 | Haka | |

FOREIGN PATENT DOCUMENTS

| | | |
|---|---|---|
| GB | 2125911 | 3/1984 |
| JP | 59126124 | 1/1983 |

OTHER PUBLICATIONS

Leissa and Chern, Appropriate Analysis of the Forced Vibration Response of Plates, Journal of Vibration and Acoustics, vol. 114, 1992, pp. 106-111.

Author Unknown, Tuned Mass Dampers, Trelleborg website, http://www.trelleborg.com/en/Automotive/Light-Vehicles/Braking/Mass-Dampers/.

* cited by examiner

| | Lower Frequency | Higher Frequency | Frequency Separation |
|---|---|---|---|
| Original Rotor | 9660 Hz | 9660 Hz | 0 Hz |
| Localized Mass Rotor | 9582 Hz | 9748 Hz | 166 Hz |

VEHICLE BRAKING ASSEMBLY WITH REDUCED SQUEAL

CROSS-REFERENCE TO RELATED APPLICATIONS

This application is a divisional and claims the benefit of U.S. Non-Provisional application Ser. No. 12/417,603 titled "Vehicle Braking Assembly" filed Apr. 2, 2009, which is hereby incorporated by reference in its entirety.

TECHNICAL FIELD

The present invention relates to vehicle braking assemblies and techniques to reduce high pitched and/or undesirable noises (such as squealing) during braking.

BACKGROUND

Conventional automobiles include braking assemblies to reduce or restrict movement of a vehicle. Braking assemblies include a brake rotor and a brake pad that is configured with a friction element to engage the rotor. The brake pad can be actuated using, e.g., a hydraulic piston. A vehicle operator controls actuation of the brake pads. The brake rotor is coupled to a vehicle drive axle, which is also connected to the vehicle's powertrain.

During braking, as the brake pads engage the rotor, doing so can produce high pitched or undesirable noises. This noise is sometimes referred to as brake squeal or squeak. Brake squeal has been a customer issue within the automotive industry for years. Prior methods to reduce brake squeal, however, fall short of the teachings discussed in the present disclosure.

Shims, for example, are used in some braking assemblies to level the surface of the brake rotor, thereby reducing some unwanted noises during braking. In some designs the shims are composed of rubber. Shims, however, require additional assembly steps and increased material costs for the braking assembly. In addition to shims, some brake manufacturers include chamfers on rotor edges to reduce noise during braking. Chamfering also typically requires an additional manufacturing step to remove material from the rotor. Some braking assemblies utilize ventilation mechanisms (such as slots or pins) to reduce temperatures in the braking assembly during operation. Finally, some conventional braking assemblies include insulators attached to the back of pad shoes. These features, however, require complicated forming techniques, higher material costs and fail to consistently reduce squeal as much as the techniques discussed in the present disclosure.

Therefore it is desirable to provide a cost-effective braking assembly, and method of manufacturing the same, which reduces break squeal.

SUMMARY

The present invention may address one or more of the above-mentioned issues. Other features and/or advantages may become apparent from the description which follows.

Certain embodiments of the present invention provide a vehicle braking assembly with reduced squeal, including: a brake pad operative to apply a braking force to a brake rotor or drum, said brake pad being subject to vibration during braking; and a damper attached to the pad, configured to force a squeal reducing vibration in the brake pad. The damper includes: a first mass; a second mass connected to the first mass by a first shaft; and a third mass connected to the first mass by a second shaft. The damper includes a notch in at least one of the first shaft and second shaft.

Other embodiments of the present invention include a method of manufacturing a brake assembly configured to reduce noise during braking. The method includes: providing a brake pad; forming a rotor or drum configured to interact with the brake pad; determining an in-plane mode of vibration for at least one of the rotor, drum and brake pad; identifying an out-of-plane mode of vibration for at least one of the rotor, drum and brake pad; incorporating a damper into at least one of the rotor, drum and brake pad to split a mode of vibration for the rotor, drum or brake pad into the in-plane mode of vibration and the out-of-plane mode of vibration during braking; forming the damper to include at least three masses connected by shafts extending between at least two masses; and notching at least one shaft in a manner to increase vibration of at least one of the masses during braking.

One advantage of the present invention is that it provides cost-effective braking assemblies that reduce break squeal and methods of manufacturing the same.

Another advantage of the present invention is that it includes dampers of various configurations that enable different forced vibrations in the braking assemblies.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-18, wherein like characters represent the same or corresponding parts throughout the several views there is shown examples of vehicle braking assemblies and a method for manufacturing the same. Generally speaking, braking assemblies are configured to reduce squeal in each of the respective braking assemblies during braking. Braking assemblies include dampers that force squeal reducing vibrations in the braking assembly. The forced vibrations separate or split the modes of vibration for each braking assembly thereby causing the assemblies to produce noise at a significantly lower magnitude than contemporary designs.

Figure 1:
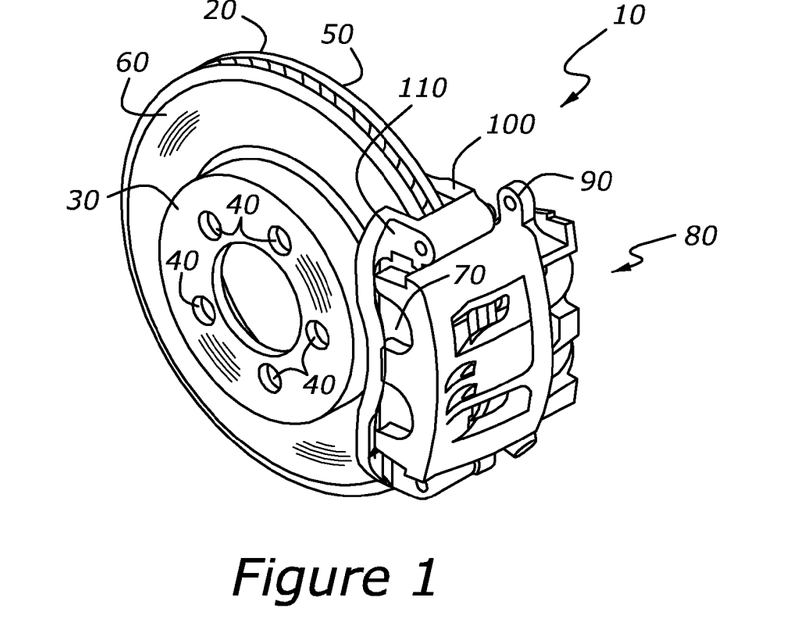
FIG. 1 is a perspective view of a braking assembly with concentrated mass dampers according to an exemplary embodiment of the present invention.

Referring now to FIG. 1, there is shown therein a braking assembly 10 according to an exemplary embodiment of the present invention. The braking assembly 10 is a disc brake assembly and can be used with any automobile or vehicle. Various types of vehicles can utilize the techniques discussed in the present disclosure including small/large cars, coupes, sedans, convertibles, trucks, vans, minivans, SUVs and motorcycles. Braking assembly 10 includes a rotor 20. Rotor 20 is attached to the wheels of the vehicle and the drive axel (not shown). Rotor 20 includes a hub 30 having orifices 40 to secure wheels of the vehicle thereto. Rotor 20 is a dual plate assembly including an inner disc 50 and an outer disc 60. Inner disc 50 and outer disc 60 are attached and configured to rotate together.

Rotor 20, as shown in FIG. 1, is configured to selectively interface with a brake pad 70 (as partially shown). A caliper 80 is provided with the brake assembly. Caliper 80 includes a bracket 90 with opposing flanges 100, 110 that can be hydraulically actuated. Brake pads, e.g., 70, are on the inner surfaces of flanges 100, 110. Rotor 20 is positioned between flanges 100, 110 and rotates between flanges when the vehicle is in motion. Brake pads 70 are configured to selectively engage with rotor 20. A piston (not shown) actuates engagement of the brake pads with rotor to institute braking.

Figure 2:
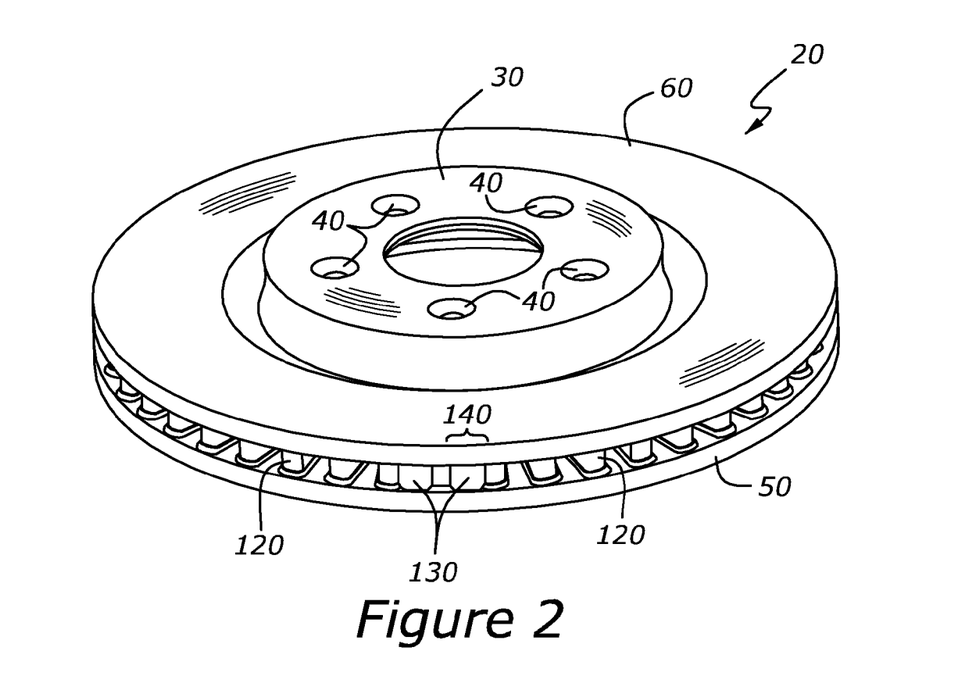
FIG. 2 is a perspective view of a rotor in the braking assembly of FIG. 1.

Referring now to FIG. 2, there is shown therein a perspective view of the brake rotor 20 of FIG. 1. Rotor 20 is shown with the outer disc 60 on top and inner disc 50 on bottom. Hub 30 is raised with respect to outer disc 60 and includes a number of orifices for wheel attachment. Between the outer disc 60 and inner disc 50 are a series of spokes 120. Spokes 120 are attached to the mating surfaces of the inner and outer disc 50, 60, respectively. Spokes 120 serve to ventilate rotor 20 during braking. Spokes 120 can also add structural rigidity to rotor 20.

The illustrated rotor 20 includes concentrated mass dampers 130 added thereto, lodged in between two spokes 120 as shown in FIG. 2. Lumped mass dampers 130 are concentrated in one sense because dampers provide a finite amount of material distributed in a small or discrete area 140 of the rotor. Mass damper 130 are not configured to expand in different areas of the rotor 20 but are localized with respect to the rotor. Dampers force a vibration in the braking assembly 10 that is localized or targeted to a precise area (e.g., 140) of the rotor. A squeal reducing vibration splitting the mode of vibration of the rotor 20 results. Masses 130 separate the tangential mode doublets of the braking assembly. In the shown embodiment, two mass dampers 130 are positioned at the perimeter of rotor 20. Mass dampers 130 are homogeneous materials. Mass dampers 130 can be composed of the same material as rotor 20 or dampers can be composed of a material having greater density than the rotor material. The higher density material increases the concentration of mass in the damper 130 at a given location. Mass dampers 130 are isotropic relatively small masses. The forced vibration caused by mass is a focused or concentrated force due to the architecture of the mass dampers 130. In one embodiment, mass dampers 130 weigh 0.2 grams. In another embodiment, mass dampers 130 weigh 26 grams and where two masses are on each side of the rotor, 52 grams are on each side of the rotor. Concentrated mass dampers 130 can also weigh greater than 26 grams.

Figure 3:
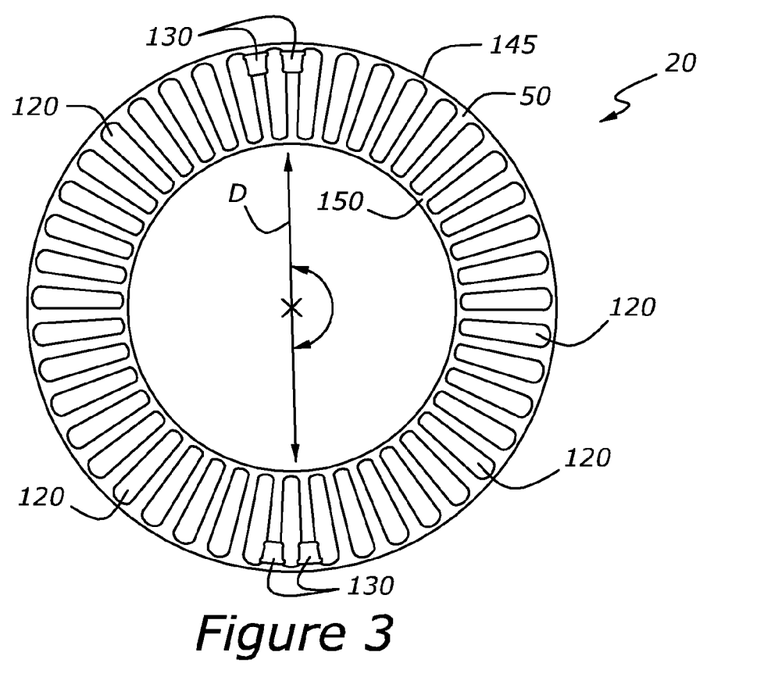
FIG. 3 is a side view of one half of the rotor of FIG. 1.

Concentrated mass dampers 130, as shown in FIG. 3, rigidly connected the outer diameter 145 or rim of the rotor 20. FIG. 3 shows the inner disc 50 of rotor 20. Included in the inner disc 50 are a series of spokes 120 that are annularly arranged with respect to the inner circumference 150 of inner disc 50. Between several spokes 120, concentrated mass dampers 130 are added to the rotor 20. Four mass dampers 130 are shown added to the rotor 20 in the illustrated embodiment. Mass dampers 130 are symmetrically positioned with respect to the diameter, D, of the inner disc 50. One half of the mass dampers are positioned 180 degrees with the other half of the mass dampers. Concentrated mass dampers 130 are positioned at diametrically opposed ends of the inner disc 50. In this way, rotor 20 is rotationally balanced and concentrated mass dampers 130 are in rotationally balanced positions with respect to the rotor. In this embodiment, concentrated mass dampers 130 are die casted and integrally formed with rotor 20. Concentrated mass dampers 130 can be attached using other forming techniques, e.g., welding or cutting.

Figure 4:
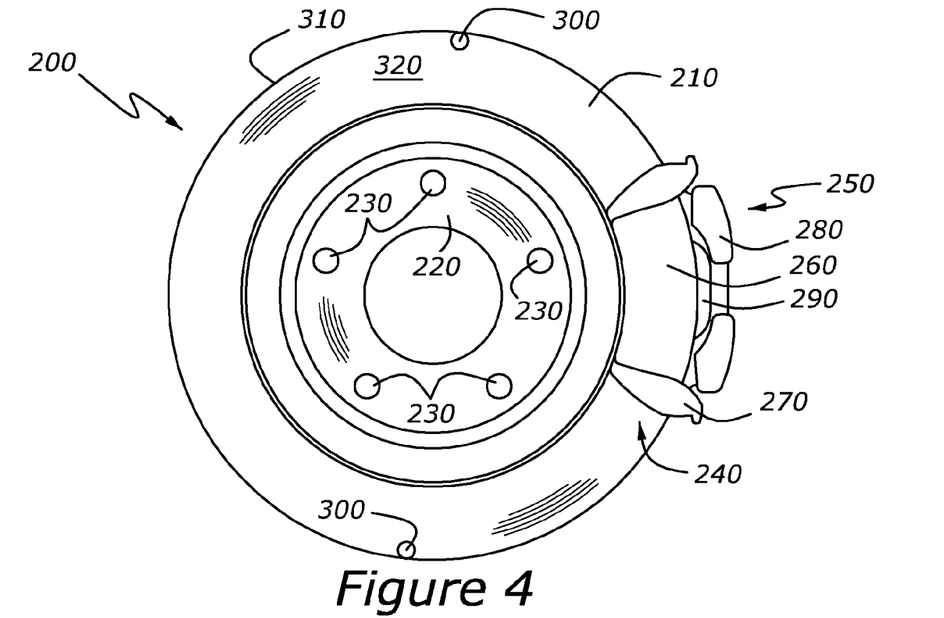
FIG. 4 is a side view of a braking assembly with concentrated mass dampers according to another exemplary embodiment of the present invention.

Referring now to FIG. 4 there is shown therein a side view of another exemplary embodiment of the present invention. A braking assembly 200 is shown. Braking assembly 200 is a disc brake assembly and can be used with any automobile or vehicle. Braking assembly includes a rotor 210. Rotor 210 can be attached to the wheels of a vehicle and a drive axel. Rotor 210 includes a hub 220, which has a raised surface with respect to rotor 20 and orifices 230 to secure wheels of the vehicle thereto.

Rotor 210, as shown in FIG. 4, is configured to selectively interface with a brake pad 240 (as partially shown). A caliper 250 is provided with the brake assembly 200. Caliper 250 includes a bracket 260 with opposing flanges 270, 280 that can be hydraulically actuated. Brake pads 240 are on the inner surfaces of flanges 270, 280. Rotor 210 is positioned between flanges 270, 280 and rotates between flanges when the vehicle is in motion. Brake pads 240 are configured to selectively engage with rotor 210. Piston 290 actuates engagement of the brake pads 240 with rotor to institute braking.

Two concentrated mass dampers 300 are included on rotor 210, as shown in FIG. 4. Mass dampers 300 are placed on the outside diameter 310 of rotor 210. Dampers 300 are positioned on the outer surface 320 or engaging surface of rotor. Mass dampers 300 are symmetrically positioned with respect to the diameter of the rotor 210. One mass damper is positioned 180 degrees with respect to the other mass damper. Concentrated mass dampers 300 are positioned at diametrically opposed ends of the rotor 210. In this way, rotor 210 is rotationally balanced and concentrated mass dampers 300 are in rotationally balanced positions with respect to the rotor. In this embodiment, concentrated mass dampers 300 are die casted and integrally formed with rotor 210. Concentrated mass dampers 300 can be attached using other forming techniques, e.g., welding or cutting.

Figure 5:
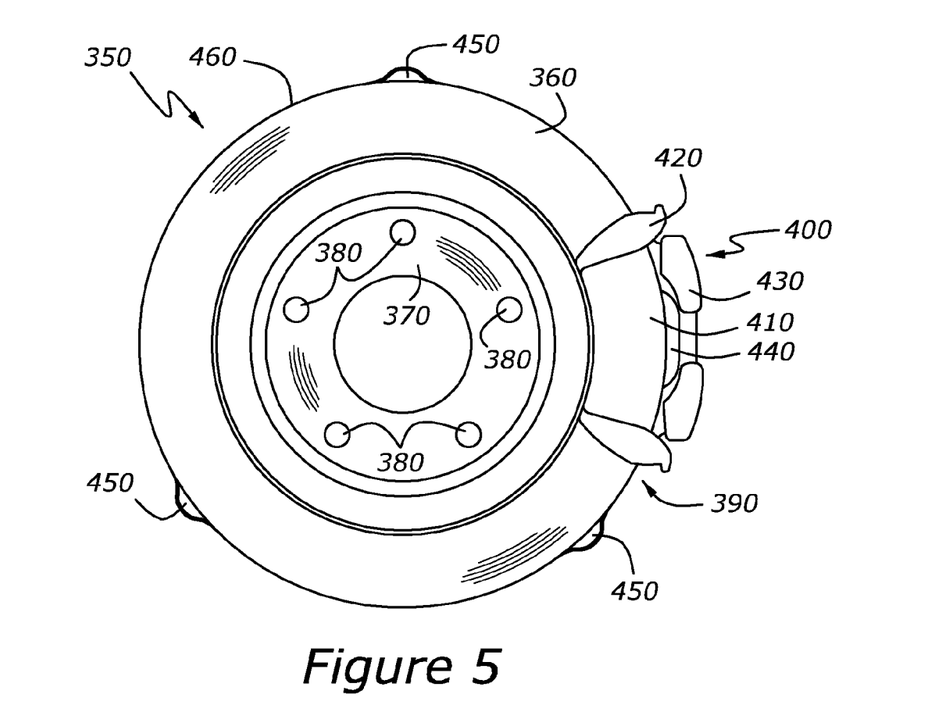
FIG. 5 is a side view of a braking assembly with concentrated mass dampers according to another exemplary embodiment of the present invention.

Referring now to FIG. 5 there is shown therein a side view of another exemplary embodiment of the present invention. A braking assembly 350 is shown. Braking assembly 350 is a disc brake assembly and can be used with any automobile or vehicle. Braking assembly 350 includes a rotor 360. Rotor 360 can be attached to the wheels of a vehicle and a drive axle. Rotor 360 includes a hub 370, which has a raised surface with respect to rotor 360 and orifices 380 to secure wheels of the vehicle thereto.

Rotor 360, as shown in FIG. 5, is configured to selectively interface with a brake pad 390 (as partially shown). A caliper 400 is provided with the brake assembly 350. Caliper 400 includes a bracket 410 with opposing flanges 420, 430 that can be hydraulically actuated. Brake pads 390 are on the inner surfaces of flanges 420, 430. Rotor 360 is positioned between flanges 420, 430 and rotates between flanges when the vehicle is in motion. Brake pads 390 are configured to selectively engage with rotor 360. Piston 440 actuates engagement of the brake pads 390 with rotor 360 to institute braking.

Three concentrated mass dampers 450 are included (or added) on rotor 360, as shown in FIG. 5. Mass dampers 450 are placed on the outside perimeter 460 of rotor 360. In the shown embodiment, concentrated mass dampers 450 have a low profile so as to clear the caliper 400 when the rotor 360 is in motion. Mass dampers 450 are asymmetrically positioned with respect to a diameter of the rotor 360. Dampers 450 are positioned 120 degrees apart, respectively. Rotor 360 is rotationally balanced and concentrated mass dampers 450 are in rotationally balanced positions with respect to the rotor. Concentrated mass dampers 450 can be attached using any number of forming techniques, e.g., casting, welding, stamping, forging or cutting.

Figure 6:
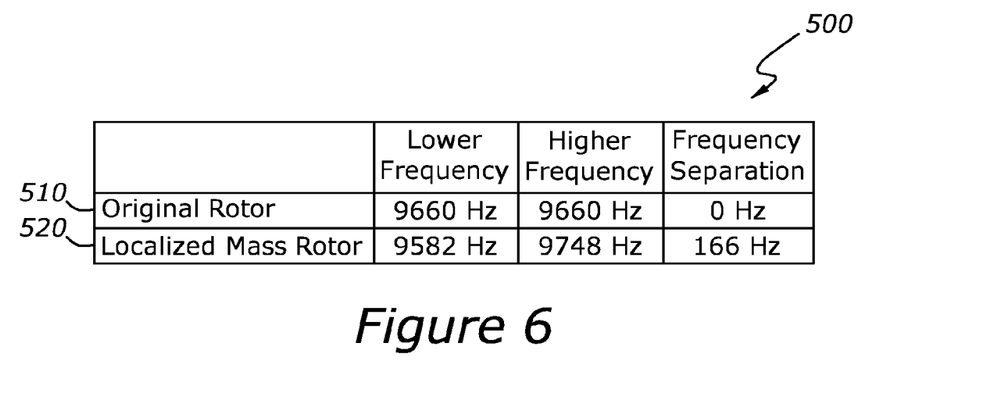
FIG. 6 is a chart showing frequencies at which squeal occurs for a conventional braking assembly and a braking assembly according to an exemplary embodiment of the present invention.

The concentrated configuration of mass dampers, e.g., 130, 300 and 450, enable a more focused or targeted dampening force in the split-mode vibration process. The resulting split-mode vibration in rotor demonstrates that the focused force produces a more potent impact on squeal reduction. FIG. 6 displays results 500 for a braking assembly with concentrated/localized mass dampers according to one exemplary embodiment of the present invention. Prior rotor designs 510 produce squeal in a lower frequency of 9660 Hz and a higher frequency of 9660 Hz. There is no frequency separation or mode splitting in these configurations. Brake squealing is noticeable at these frequencies. With concentrated mass dampers 520 a squeal reducing, mode-splitting vibration is forced in the braking assembly. Arrangements having localized or concentrated mass dampers produce squeal at a lower frequency e.g., 9582 Hz. Squeal occurs at a higher, less utilized, frequency of 9748 Hz. The frequencies are separated or split by 166 Hz.

Figure 7:
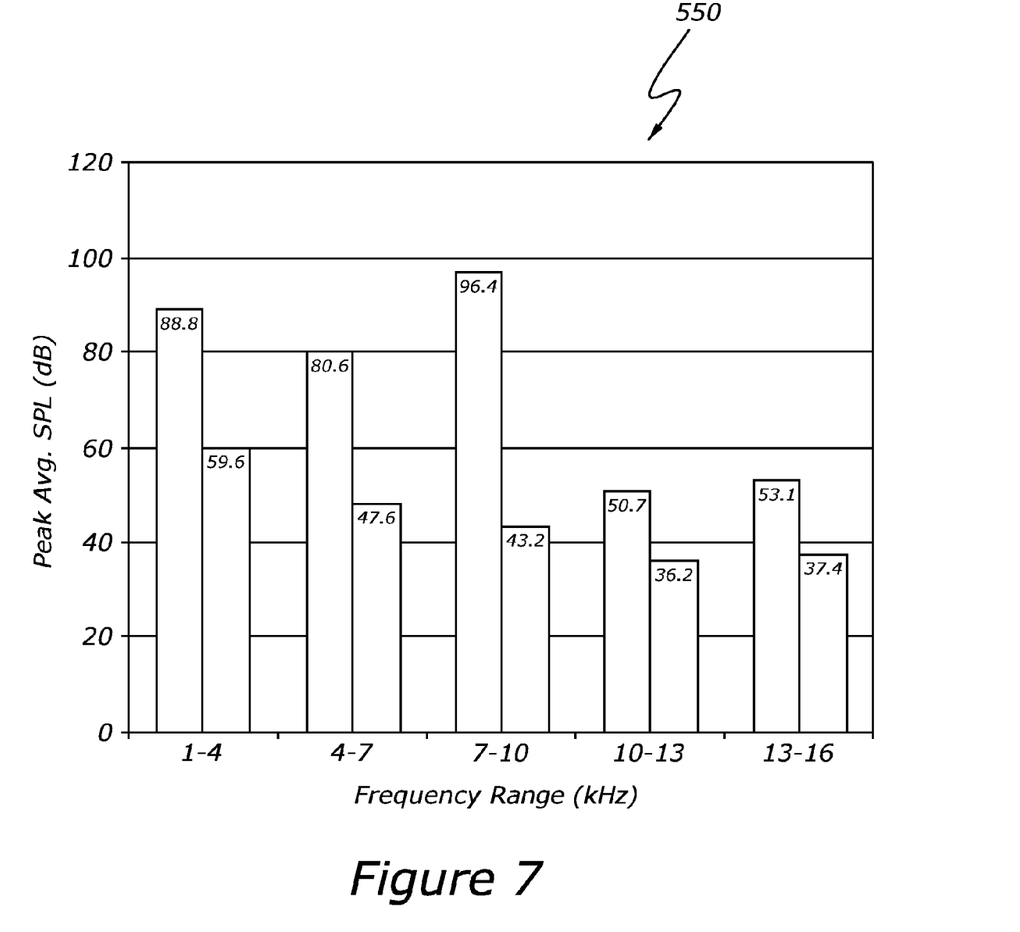
FIGS. 7-8 illustrate graphs of the peak and average sound pressure levels for braking assemblies with and without concentrated mass dampers, respectively.
Figure 8:
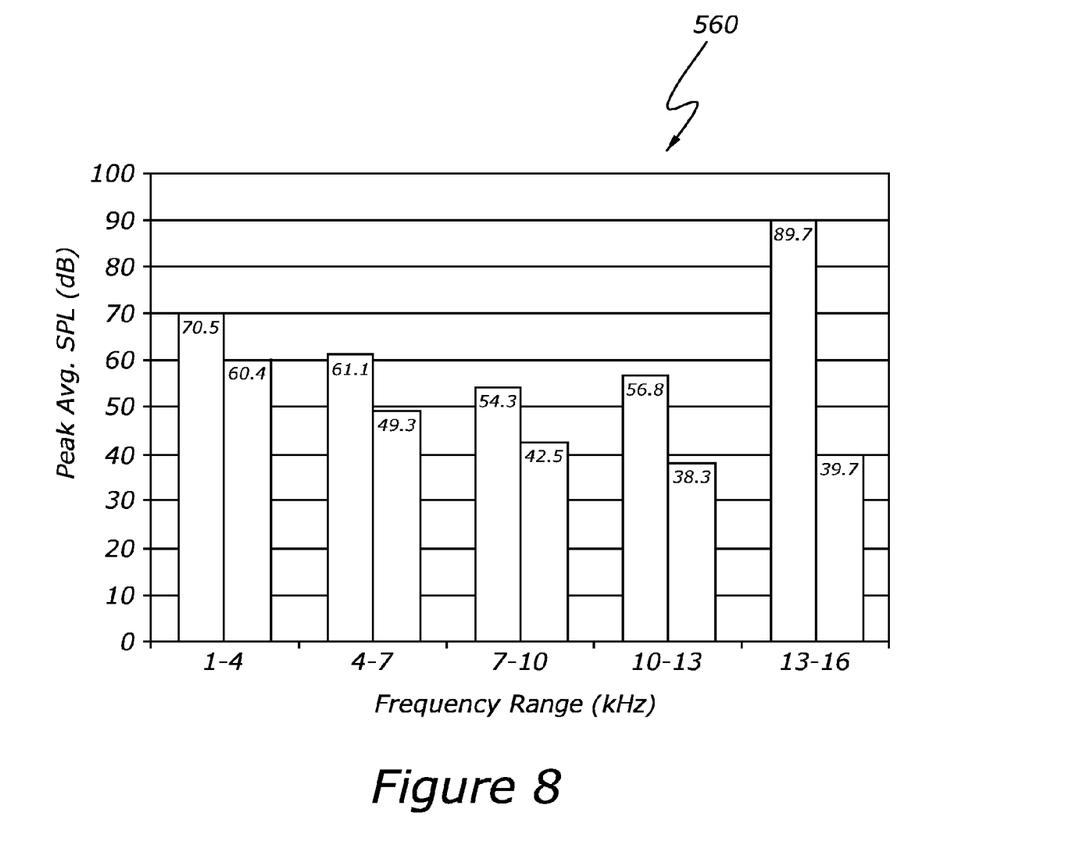

Further related to the results of this configuration, there are shown graphs of the performance of braking assemblies without the concentrated mass dampers and braking assemblies with concentrated mass dampers, as shown in FIGS. 7 and 8, respectively. FIG. 7 displays the noise output of a disc braking assembly without concentrated mass dampers. The graph 550 illustrates both the peak and average sound pressure levels for the braking assembly during operation. Without any concentrated mass dampers, when the braking assembly is vibrating between 1 and 4 kilohertz (kHz) the peak or maximum noise output is 88.8 decibels (dB) and the average sound pressure level in this range is 59.6 dB. This frequency range produces the highest average sound pressure level when braking. As the braking assembly vibrates between 4 and 7 kHz, the peak noise output is 80.6 dB. The average sound pressure level in this range is 47.6 dB. Between 7 and 10 kHz the peak noise output is 96.4 dB and the average sound pressure level is 43.2 dB. This range of vibration produces the highest peak sound pressure levels for the braking assembly. Squealing can be more pervasive in this range of vibration. Measurements were next taken from between 10 and 13 kHz. In this range the peak sound pressure level for the braking assembly is 50.7 dB and the average sound pressure level is 36.2 dB. This frequency range produces the lowest peak and average sound pressure levels when braking. The last measurements were taken at frequencies between 13 and 16 kHz. The peak sound pressure level in this range was 53.1 dB with an average sound pressure level of 37.4 dB.

FIG. 8 displays a graph 560 the noise output of a disc braking assembly with concentrated mass dampers. With the concentrated mass dampers the braking assembly is generally significantly quieter during braking. The overall maximum sound pressure level generated by the braking assembly is lower. At lower frequencies the peak sound pressure levels are also drastically reduced for the assembly with concentrated mass dampers. In the middle frequency range, the average sound pressure level reduced as well. More specifically, with concentrated mass dampers, when the braking assembly is vibrating between 1 and 4 kHz the peak or maximum noise output is 70.5 dB and the average sound pressure level in this range is 60.4 dB. The peak sound pressure level with concentrated mass dampers is 18 dB lower than the assembly without dampers. As the braking assembly vibrates between 4 and 7 kHz, the peak noise output is 61.1 dB or 19 dB lower than without the concentrated mass dampers. The average sound pressure level in this range is 49.3 dB. Between 7 and 10 kHz the peak noise output is 54.3 dB, more than 40 dB lower than the peak sound pressure level noticed without concentrated mass dampers. In this range the average sound pressure level is 42.5 dB. This range of vibration produces the lowest peak sound pressure levels for the braking assembly. Measurements taken between 10 and 13 kHz produced a peak sound pressure level for the braking assembly at 56.8 dB and the average sound pressure level is 38.3 dB. Finally, measurements taken at frequencies between 13 and 16 kHz produced a peak sound pressure level of 89.7 dB with an average sound pressure level of 39.7 dB. This frequency range produces the highest average sound pressure level when braking.

Dampers of other configurations are shown and discussed in the present disclosure as well. Though the dampers discussed herein can be utilized with either disc brakes or drum brakes the following dampers are taught with respect to drum brake assemblies.

Figure 9:
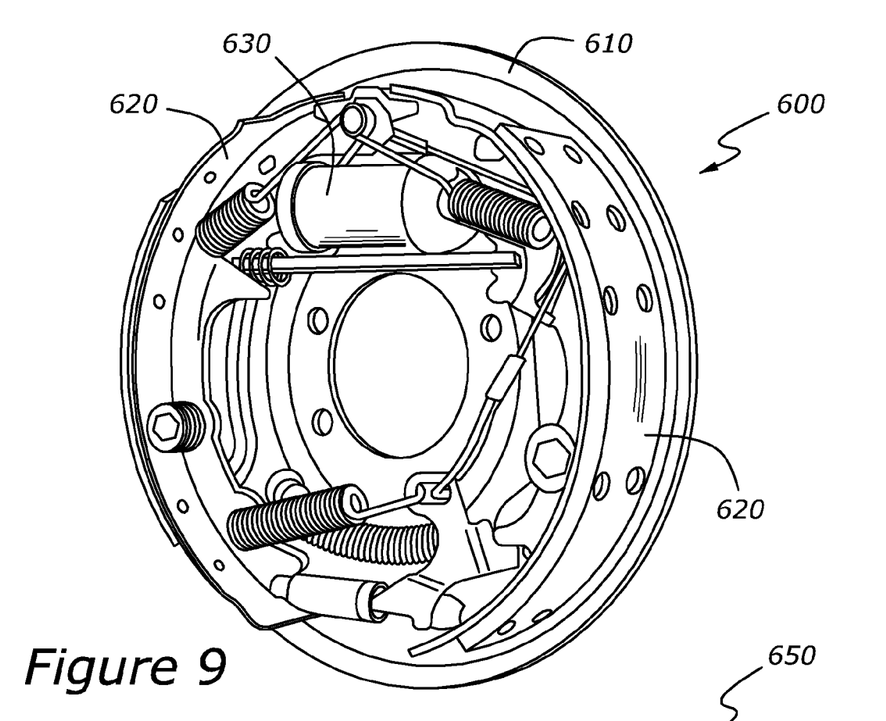
FIG. 9 is a perspective view of a braking assembly with dampers according to another exemplary embodiment of the present invention.

Referring now to FIG. 9, there is shown therein a braking assembly 600 that is a drum brake. Braking assembly 600 includes a backing plate 610 with holes through which wheels of a vehicle can be attached. Backing plate 610 and the braking assembly 600 as shown in FIG. 9, rotate with the wheels when the vehicle is in motion. The braking assembly 600 includes a pair of brake shoes 620 affixed proximate the outer diameter of the backing plate 610. Shoes 620 can be actuated to change their radial position with respect to the backing plate 610. A wheel cylinder 630 is provided to actuate shoes 620. Brake shoes 620 are fitted with brake pads, as later discussed, to selectively engage pads on an outer drum (not shown) to institute braking.

Figure 10:
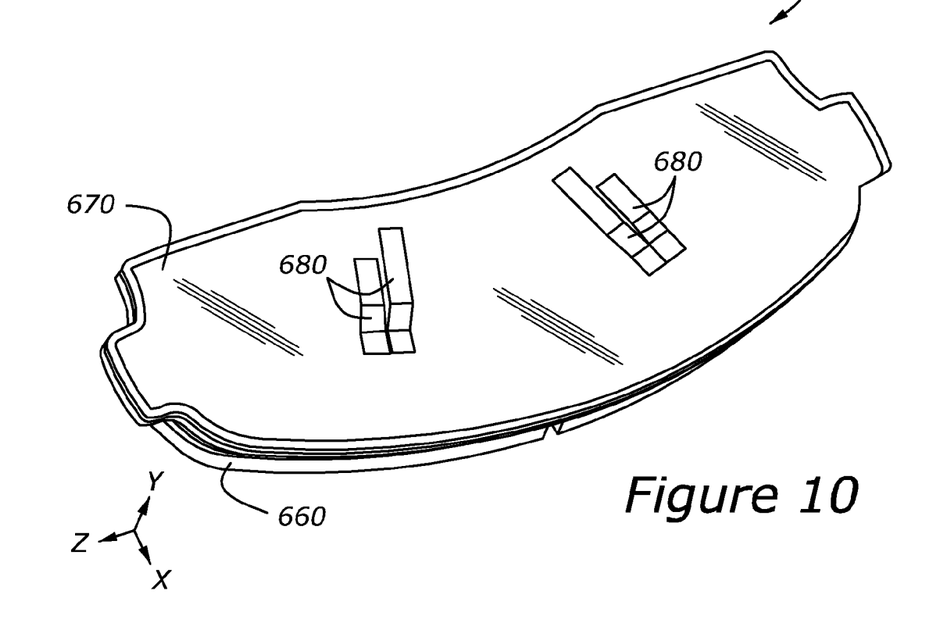
FIG. 10 is a perspective view of a brake pad having dampers according to another exemplary embodiment of the present invention.

With reference to FIG. 10, there is shown therein a brake pad 650 for use with a disc or drum brake assembly. Brake pad 650 is of a semi-circular configuration and includes two sections 660, 670. A piston or actuator (not shown) engages the back section 670 of pad to activate braking assembly. The back section 670 is affixed to the front section 660 of the pad. The front section 660 includes a course material configured to generate high frictional forces upon engagement. Brake pad 650 applies a braking force to a brake rotor or disc. When brake pad 650 applies a force the pad is subject to vibration. Fitted in section 670 of the brake pad 650 are four dampers 680 as schematically shown in FIG. 10. Dampers 680 are arranged to extend in the same direction with respect to the pad 650. Dampers 680 force vibration in pad 650 when braking occurs. Any of the dampers 680 discussed herein can be implemented into brake pad 650 in the shown exemplary configuration.

Figure 11:
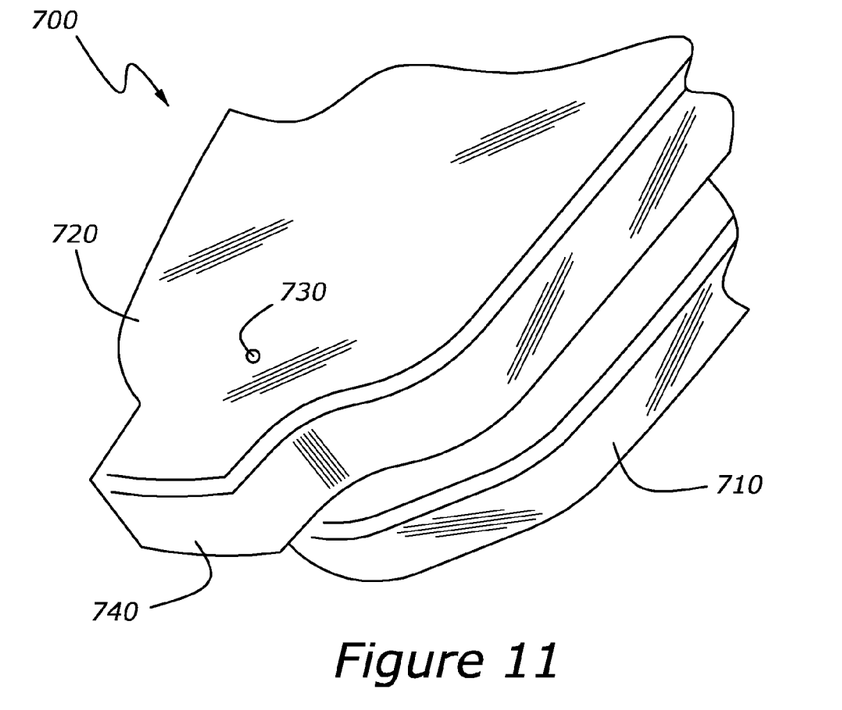
FIG. 11 is a perspective view of a brake pad having dampers according to another exemplary embodiment of the present invention.

In FIG. 11, there is shown another exemplary configuration of the present invention. FIG. 11 is a partial perspective view of a brake pad 700. The pad 700 includes a back section 710 affixed to the front section 720 of the pad. A piston or actuator (not shown) engages the back section 710 of pad to activate braking assembly. The front section 720 includes a course material configured to generate high frictional forces upon engagement. Fitted in section 720 of the brake pad 700 is a concentrated mass damper 730. Damper 730 is attached to an end 740 of the brake pad 700. Damper forces vibration at end 740 of pad when braking occurs. Damper can be, for example, attached to brake pad 700 using any number of forming techniques, e.g., casting, welding, stamping, cutting or forging. Any of the dampers discussed herein can be implemented into brake pads in the shown exemplary configurations of FIGS. 10-11 or other configurations.

Referring now to FIGS. 12-17, there is shown therein dampers that can be included in either a drum or disc brake assembly to reduce squeal during braking. Dampers can also be rigidly connected to the outer or inner surfaces of a brake pad. Shown are sprung mass dampers where at least one mass has an additional degree of freedom to vibrate with respect to the brake pad in each damper. Dampers are designed to vibrate at identified or predetermined excited natural frequencies close to the squeal frequency emanating objectionable brake noise.

Figure 12:
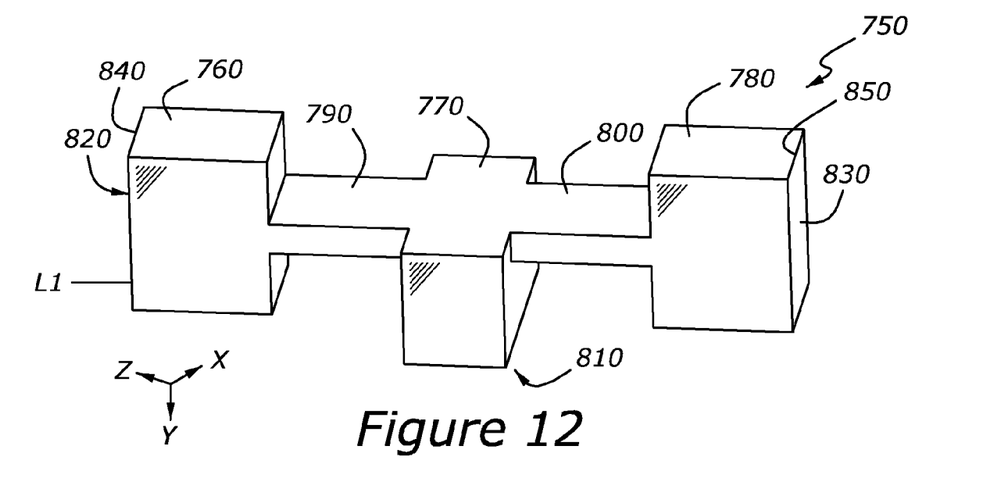
FIGS. 12-17 illustrate dampers according to various exemplary embodiments of the present invention.

With reference to FIG. 12, a damper 750 that can be affixed to a brake pad or rotor is shown. Damper 750 is a multiple mass damper. Damper includes three separate masses 760, 770 and 780. Masses 760, 770 and 780 are rectangular. In the shown exemplary embodiment, masses 760, 770 are interconnected by shaft 790. Masses 770, 780 are interconnected through shaft 800. Shaft 790 is attached at the vertical center of mass 760. Shaft 800 is attached at the center of mass 780. Mass 770 is not centered with respect to neither shaft 790, 800. Damper 750 is asymmetrical with respect to longitudinal axis L1 as shown in FIG. 12. Mass 770 is attached to the brake pad at area 810. Mass 770 can be attached to brake pad using conventional attachment techniques, e.g., welding or gluing. Masses 760 and 780 are not affixed to pad and are configured to vibrate with respect to mass 770 as well as with respect to the brake pad. Masses 760, 780 have a degree of freedom to vibrate with respect to the brake pad.

Damper 750 is configured to force a squeal reducing vibration in braking assembly. Damper 750 can be altered to force other squeal reducing vibrations. For example, the manner in which damper 750 is attached to brake pad can alter the vibration of damper as well as the forced vibration or mode splitting effects the damper has on the braking assembly. Various attachment schemes can be employed with the exemplary damper shown in FIG. 12. In another embodiment, mass 760 is attached to brake pad. In this arrangement, masses 770, 780 are not affixed to brake pad and have an additional degree of freedom of vibration with respect to the brake pad. Likewise, mass 780 can be attached to brake pad and masses 760, 770 can be unattached configured to have an additional degree of freedom to vibrate with respect to the brake pad. In yet another embodiment, masses 760, 780 are attached to brake pad. In this configuration mass 770 has a degree of freedom to vibrate with respect to the brake pad. In another embodiment, shafts 790, 800 are singularly or collectively connected to brake pad. It will be appreciate that masses and shafts can be connected at any surface or point to tailor the dampening characteristics of damper.

The dimensions and performance characteristics of one example of the embodiment shown in FIG. 12 are provided as follows. The width of the top surface of mass 760 is 7 mm, surfaces 820, 830 are 8.4 mm long. Surfaces 840, 850 are 6 mm in thickness. Mass 760 extends 3.4 mm above and below shaft 790. Mass 780 is of a substantially the same dimensions as mass 760. Shafts 790, 800 are 7 mm long on each side of mass 770. Mass 770 extends 3 mm from shafts 790, 800 on each side. Mass 770 is 5 mm wide and 6 mm in length. Shafts 790, 800 are 1.6 mm thick. Mass 770 is 12 mm thick. In this configuration, while mass 760 vibrates at 2.4 kHz, mass 770 vibrates at 2.75 kHz and mass 780 vibrates at 6.99 kHz.

Figure 13:
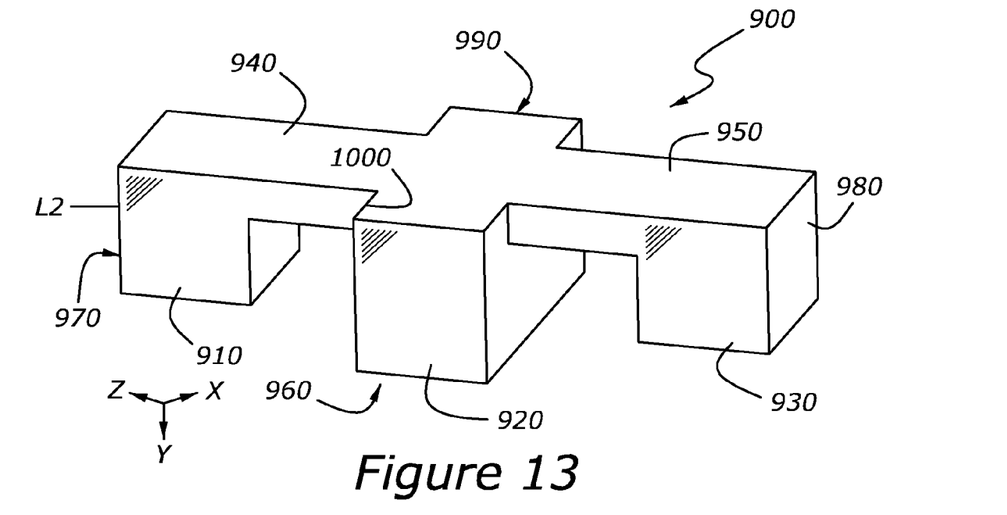

Referring now to FIG. 13, a damper 900 that can be affixed to a brake pad or rotor is shown. Damper 900 is a multiple mass damper. Damper 900 includes three separate masses 910, 920 and 930. Masses 910, 920 and 930 are rectangular. In the shown exemplary embodiment, masses 910, 920 are interconnected by shaft 940. Masses 920, 930 are interconnected through shaft 950. Neither shaft 940 nor shaft is attached at the vertical center of masses 910, 920 and 930. Damper 900 is asymmetrical with respect to longitudinal axis L2 as shown in FIG. 13. Mass 920 is attached to the brake pad at area 960. Mass 920 can be attached to brake pad using conventional attachment techniques, e.g., welding or gluing. Masses 910, 930 are not affixed to pad and are configured to vibrate with respect to mass 920 as well as with respect to the brake pad. Masses 910, 930 have a degree of freedom to vibrate with respect to the brake pad. In another embodiment, mass 910 is attached to brake pad. In this arrangement, masses 920, 930 are not affixed to brake pad and have an additional degree of freedom of vibration with respect to the brake pad. Likewise, mass 930 can be attached to brake pad and masses 910, 920 can be unattached configured to have an additional degree of freedom to vibrate with respect to the brake pad. In yet another embodiment, masses 910, 930 are attached to brake pad. In this configuration mass 920 has a degree of freedom to vibrate with respect to the brake pad. In another embodiment, shafts 940, 950 are singularly or collectively connected to brake pad. It will be appreciate that masses and shafts can be connected at any surface or point to tailor the dampening characteristics of damper.

The dimensions and performance characteristics of one example of the embodiment shown in FIG. 13 are provided as follows. The width of mass 910 is 5 mm, surfaces 970, 980 are 5 mm long. Mass 910 is 6 mm thick. Mass 910 extends 3.4 mm from shaft 940. Mass 920 is 6 mm in length and 12 mm thick. Shaft 940 is 10 mm long. Mass 930 is of a substantially the same dimensions as mass 910. Surface 990 is 5 mm in width. Surface 1000 is 3 mm from shaft 940. Shafts 940, 950 are 6 mm thick. In this configuration, while mass 910 vibrates at 5.6 kHz, mass 920 vibrates at 6.4 kHz and mass 930 vibrates at 12.4 kHz.

Figure 14:
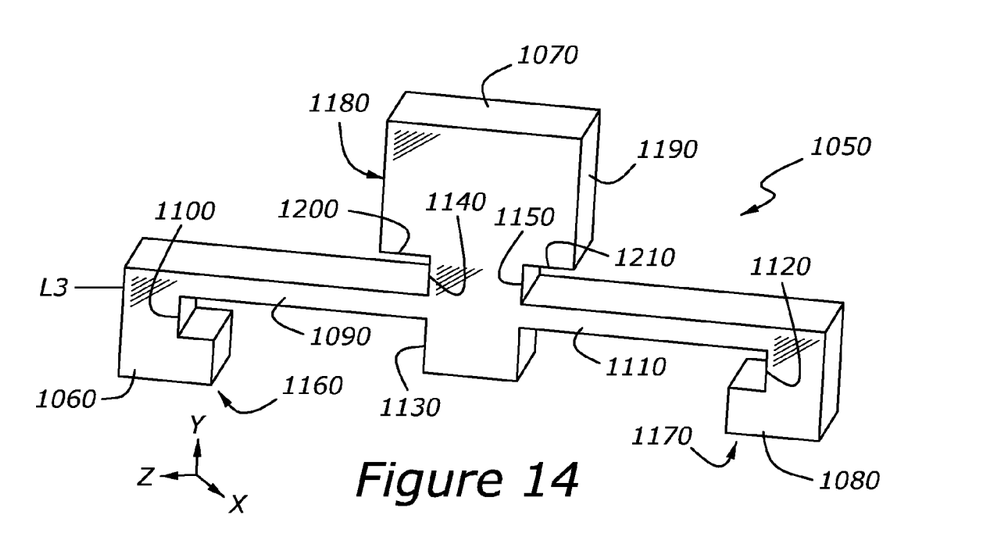

Referring now to FIG. 14, a damper 1050 that can be affixed to a brake pad or rotor is shown. Damper 1050 is a multiple mass damper. Damper includes three separate masses 1060, 1070 and 1080. Masses 1060, 1070 and 1080 are rectangular. In the shown exemplary embodiment, masses 1060 and 1070 are interconnected by shaft 1090. Shaft 1090 is notched at 1100. Notch 1100 enables mass 1060 to vibrate at another degree of freedom with respect to the brake pad. Masses 1070 and 1080 are interconnected through shaft 1110. Shaft 1110 is notched at 1120. Shaft 1110 is not centered with respect to any of the masses 1060, 1070 nor 1080. Damper 1050 is asymmetrical with respect to longitudinal axis L3 as shown in FIG. 14. Mass 1070 has a T-shaped configuration. A stem 1130 of mass 1070 is centered in shafts 1090, 1110. Notches 1140, 1150 result from the position of stem, thereby enabling mass to vibration at additional degrees of freedom with respect to brake pad. Notches 1100, 1120, 1140 and 1150 can reduce the overall needed size of damper 1050. In this example, Masses 1060, 1080 are attached to the brake pad at areas 1160, 1170. Masses 1060, 1180 can be attached to brake pad using conventional attachment techniques, e.g., welding or gluing. Mass 1070 is not affixed to pad and is configured to vibrate with respect to masses 1060, 1080 as well as with respect to the brake pad. Mass 1080 has an additional degree of freedom to vibrate with respect to the brake pad.

In another embodiment, mass 1070 is attached to brake pad. In this arrangement, masses 1060, 1080 are not affixed to brake pad and have an additional degree of freedom of vibration with respect to the brake pad. Likewise, mass 1080 can be attached to brake pad and masses 1060, 1070 can be unattached configured to have an additional degree of freedom to vibrate with respect to the brake pad. In yet another embodiment, masses 1070, 1080 are attached to brake pad. In this configuration mass 1060 has a degree of freedom to vibrate with respect to the brake pad. In another embodiment, shafts 1090, 1110 are singularly or collectively connected to brake pad. It will be appreciate that masses and shafts can be connected at any surface or point to tailor the dampening characteristics of damper.

The dimensions and performance characteristics of one example of the embodiment shown in FIG. 14 are provided as follows. The width of the top surface of mass 1070 is 10.5 mm, surfaces 1180, 1190 are 7.25 mm long. Surfaces 1200, 1210 are 2.75 mm in width and are 2.25 mm from shafts 1090, 1110. Masses 1060, 1080 are 6 mm thick and 5 mm wide. Masses 1060, 1080 extend 6 mm from shafts 1090, 1110, respectively. Stem 1130 extends 3 mm from shafts 1090, 1110. The bottom surface of stem 1130 is 5 mm wide. Shafts 1090, 1110 are 1.2 mm by 6 mm. The top surfaces of shafts 1090, 1110 are 16.5 mm long. The bottom surfaces of shafts 1090, 1110 are 13.5 mm in length. Notch 1100 is 2.25 mm by 2 mm. Mass 1060 extends 2.55 mm from notch 1100. Mass 1080 and notch 1120 are of substantially the same dimensions as mass 1060 and notch 1100. In this configuration, while mass 1060 vibrates at 2.2 kHz, mass 1070 vibrates at 2.7 kHz and mass 1080 vibrates at 4.1 kHz.

Figure 15:
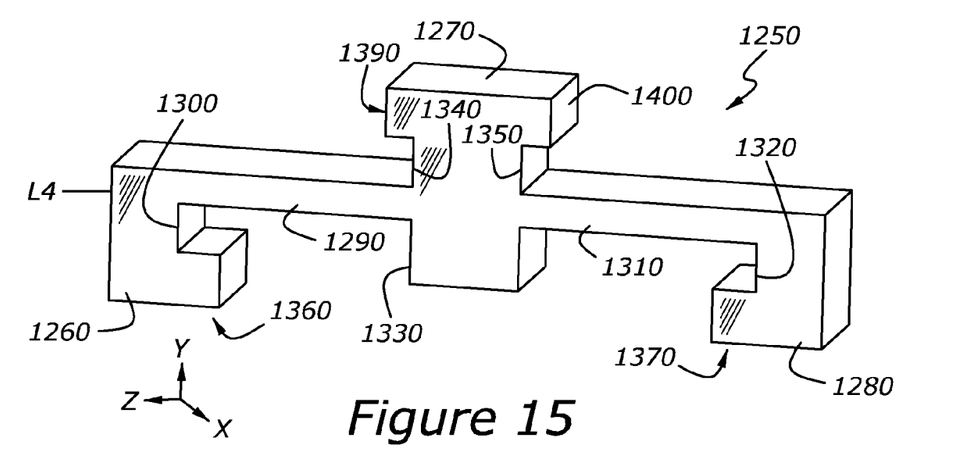

Referring now to FIG. 15, a damper 1250 that can be affixed to a brake pad or rotor is shown. Damper 1250 is a multiple mass damper. Damper 1250 includes three separate masses 1260, 1270 and 1280. Masses 1260, 1270 and 1280 are rectangular. In the shown exemplary embodiment, masses 1260, 1270 are interconnected by shaft 1290. Shaft 1290 is notched at 1300. Notch 1300 enables mass 1260 to vibrate at another degree of freedom with respect to the brake pad. Masses 1270, 1280 are interconnected through shaft 1310. Shaft 1310 is notched at 1320. Shafts 1290, 1310 are not centered with respect to any of the masses 1260, 1270 and 1280. Damper 1250 is asymmetrical with respect to longitudinal axis L4 as shown in FIG. 15. Mass 1270 has a T-shaped configuration. Masses 1260, 1280 are centered at a stem 1330 of mass 1270. Notches 1340, 1350 result from the position of stem 1330, thereby enabling mass 1270 to vibration at additional degrees of freedom with respect to brake pad. In this example, Masses 1260, 1280 are attached to the brake pad at areas 1360, 1370. Masses 1260, 1280 can be attached to brake pad using conventional attachment techniques, e.g., welding or gluing. Mass 1270 is not affixed to pad and is configured to vibrate with respect to masses 1260, 1280 as well as with respect to the brake pad. Mass 1270 has an additional degree of freedom to vibrate with respect to the brake pad.

In another embodiment, mass 1270 is attached to brake pad. In this arrangement, masses 1260, 1280 are not affixed to brake pad and have an additional degree of freedom of vibration with respect to the brake pad. Likewise, mass 1260 can be attached to brake pad and masses 1270, 1280 can be unattached configured to have an additional degree of freedom to vibrate with respect to the brake pad. In yet another embodiment, masses 1270, 1280 are attached to brake pad. In this configuration mass 1260 has a degree of freedom to vibrate with respect to the brake pad. In another embodiment, shafts 1290, 1310 are singularly or collectively connected to brake pad. It will be appreciate that masses and shafts can be connected at any surface or point to tailor the dampening characteristics of damper.

The dimensions and performance characteristics of one example of the embodiment shown in FIG. 15 are provided as follows. The width of the top surface of mass 1270 is 7.5 mm, shafts 1390, 1400 are 2.25 mm long and 1.25 mm in width. Shafts 1390, 1400 are 2.25 mm from shafts 1290, 1310. Shafts 1390, 1400 are 1.5 mm by 6 mm. Stem 1330 is 5 mm wide, 6 mm thick and extends 3 mm from shafts 1290, 1310. The top surfaces of shafts 1290, 1310 are 14 mm long. The bottom surfaces of shafts 1290, 1310 are 11 mm in length. Outer surface of mass 1260 is 6.23 mm long. Notch 1300 is 2.25 mm by 2 mm. Inner surface of mass 1260 is 2.483 mm long. Mass 1280 and notch 1320 are of substantially the same dimensions. In this configuration, while mass 1260 vibrates at 6.68 kHz, mass 1270 vibrates at 8.698 kHz and mass 1280 vibrates at 14.2 kHz.

Figure 16:
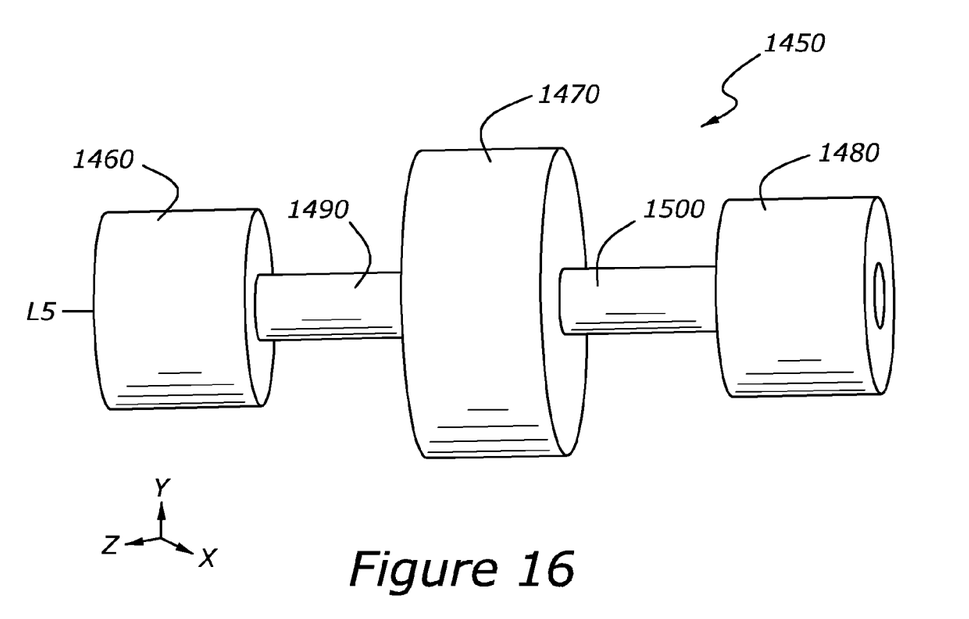

With reference to FIG. 16, a damper 1450 that can be affixed to a brake pad or rotor is shown. Damper 1450 is a multiple mass damper. Damper 1450 includes three separate masses 1460, 1470 and 1480. Masses 1460, 1470 and 1480 and shafts 1490, 1500 are cylindrical. The cylindrical configuration of damper 1450 provides a size efficient for packaging in limited areas of a braking assembly, e.g., the pad ear and inner pad between the brake pad and caliper. In the shown exemplary embodiment, masses 1460, 1470 are interconnected by shaft 1490. Masses 1470, 1480 are interconnected through shaft 1500. Shafts 1490, 1500 are attached at the vertical center of masses 1460, 1470 and 1480. Damper 1450 is symmetrical with respect to longitudinal axis L5 as shown in FIG. 16. Mass 1470 is attached to the brake pad. Mass 1470 can be attached to brake pad using conventional attachment techniques, e.g., welding or gluing. Masses 1460, 1480 are not affixed to pad and are configured to vibrate with respect to mass 1470 as well as with respect to the brake pad. Masses 1460, 1480 have a degree of freedom to vibrate with respect to the brake pad.

In another embodiment, mass 1460 is attached to brake pad. In this arrangement, masses 1470, 1480 are not affixed to brake pad and have an additional degree of freedom of vibration with respect to the brake pad. Likewise, mass 1480 can be attached to brake pad and masses 1460, 1470 can be unattached configured to have an additional degree of freedom to vibrate with respect to the brake pad. In yet another embodiment, masses 1460, 1470 are attached to brake pad. In this configuration mass 1480 has a degree of freedom to vibrate with respect to the brake pad. In another embodiment, shafts 1490, 1500 are singularly or collectively connected to brake pad. It will be appreciate that masses and shafts can be connected at any surface or point to tailor the dampening characteristics of damper.

The dimensions and performance characteristics of one example of the embodiment shown in FIG. 16 are provided as follows. The width of mass 1460 is 3.3 mm; the diameter is 4.5 mm. Mass 1480 is of a substantially the same dimensions as mass 1460. Mass 1460 is positioned 3.6 mm apart from mass 1470 along shaft 1490. Mass 1470 is 3 mm in thickness and the diameter is 7 mm. Diameter of shafts 1490, 1500 are 1.4 mm. In this configuration, while masses 1460, 1480 vibrate at 6.2 kHz, mass 1470 vibrates at 6.3 kHz.

Figure 17:
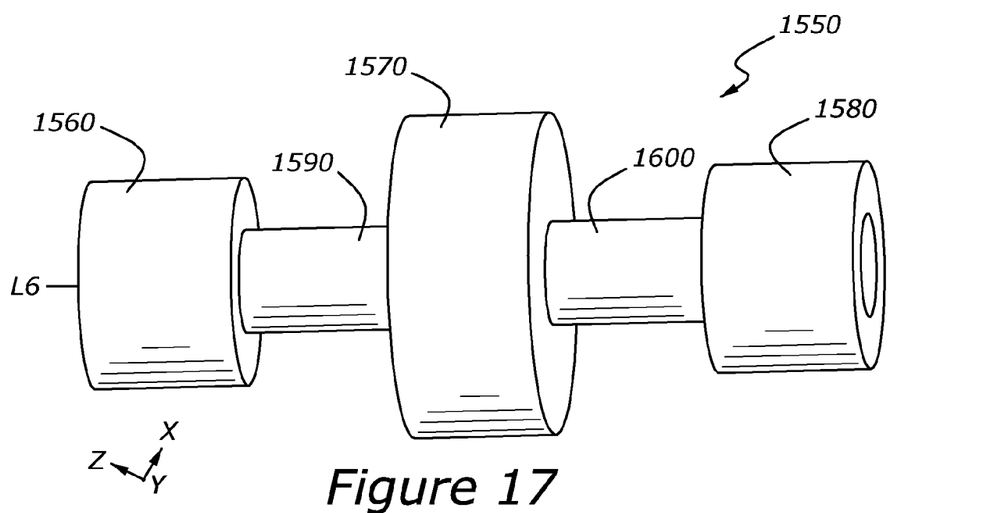

With reference to FIG. 17, a damper 1550 that can be affixed to a brake pad or rotor is shown. Damper 1550 is a multiple mass damper. Damper 1550 includes three separate masses 1560, 1570 and 1580. Masses 1560, 1570 and 1580 and shafts 1590, 1600 are cylindrical. In the shown exemplary embodiment, masses 1560, 1570 are interconnected by shaft 1590. Masses 1570, 1580 are interconnected through shaft 1600. Shafts 1590, 1600 are attached at the vertical center of mass 1560, 1570 and 1580. Damper 1550 is symmetrical with respect to longitudinal axis L6 as shown in FIG. 17. Mass 1560 is attached to the brake pad. Mass 1560 can be attached to brake pad using conventional attachment techniques, e.g., welding or gluing. Masses 1570, 1580 are not affixed to pad and are configured to vibrate with respect to mass 1560 as well as with respect to the brake pad. Masses 1570, 1580 have a degree of freedom to vibrate with respect to the brake pad.

In another embodiment, mass 1570 is attached to brake pad. In this arrangement, masses 1560, 1580 are not affixed to brake pad and have an additional degree of freedom of vibration with respect to the brake pad. Likewise, mass 1580 can be attached to brake pad and masses 1560, 1570 can be unattached configured to have an additional degree of freedom to vibrate with respect to the brake pad. In another embodiment, shafts 1590, 1600 are singularly or collectively connected to brake pad. It will be appreciate that masses and shafts can be connected at any surface or point to tailor the dampening characteristics of damper.

The dimensions and performance characteristics of one example of the embodiment shown in FIG. 17 are provided as follows. The width of mass 1560 is 3.3 mm; the diameter is 4.5 mm. Mass 1580 is of a substantially the same dimensions as mass 1560. Mass 1560 is positioned 3.6 mm apart from mass 1570 along shaft 1590. Mass 1570 is 3 mm in thickness and the diameter is 7 mm. Diameter of shafts 1590, 1600 are 2 mm. In this configuration, while masses 1560, 1580 vibrate at 10.67 kHz, mass 1570 vibrates at 12.1 kHz.

Figure 18:
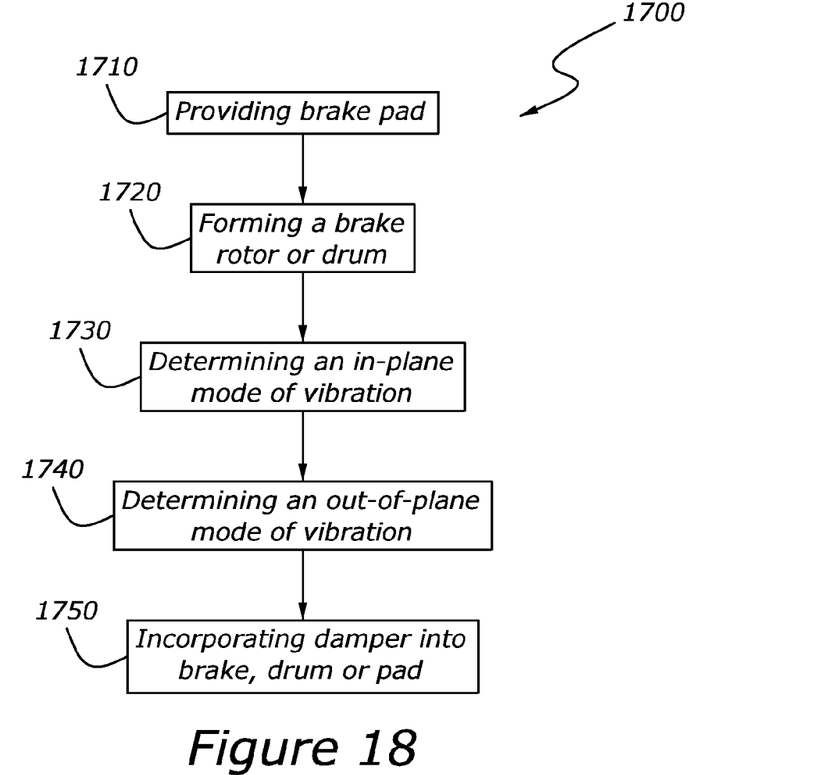
FIG. 18 illustrates a method of manufacturing a braking assembly according to several exemplary embodiments of the present invention.

FIG. 18 shows a method 1700 of manufacturing a brake assembly configured to reduce noise during braking. The steps of the method 1700 include: providing a brake pad 1710; forming a rotor or drum configured to interact with the brake pad 1720; determining an in-plane mode of vibration for the rotor, drum or brake pad 1730; identifying an out-of-plane mode of vibration for the rotor, drum or brake pad 1740; and incorporating a damper into the rotor, drum and brake pad to split a mode of vibration for the rotor, drum or brake pad into the in-plane mode of vibration and the out-of-plane mode of vibration during braking 1750. (Exemplary rotors, drums and brake pads are shown in FIGS. 1-5, 9 and 10-11, respectively). In-plane and out-of-plane modes of vibration can be derived using various methods, e.g., measuring, simulation or estimation based on the structural characteristics of the braking assembly. Dampers can be formed, for example, by integrating the damper castings into the rotor or drum castings for the braking assembly. This presents one cost-effective method of manufacture for the braking assembly. The method can also include forming the damper to include at least three masses connected by shafts extending between at least two masses, as shown e.g., in FIGS. 12-17. Notches can be implemented in the damper as shown in FIGS. 14-15. Notches can be formed, for example, by integrating the notches into the rotor or drum castings for the braking assembly. One application of the method includes notching at least one shaft in a manner to increase vibration of at least one of the masses during braking, as shown e.g., in FIG. 15. In another embodiment, the method 1700 of manufacture includes incorporating another damper in the rotor and rotationally balancing the dampers with respect to the rotor. Dampers can be attached to the rotor in diametrically opposed locations with respect to the rotor, as shown e.g., in FIG. 3.

One or more of these braking assemblies can be used in the various exemplary embodiments of the present teachings and a damper can be adapted to force the desired mode-splitting or squeal reducing vibration. The dimensions of the shafts (or cantilevers) and masses discussed herein can be altered to force various squeal reducing vibrations. Though in the some exemplary embodiments, shafts are of a substantially similar length and configuration, any of the shafts can be of different lengths in the same damper. Moreover, though in the some exemplary embodiments, masses are of a substantially similar size and configuration, any of the shafts can be of different lengths or girths in the same damper. Shafts and masses can be of any shape, similar or dissimilar within the same damper, and are not limited to cylindrical or rectangular configurations. In other exemplary embodiments, shafts and masses are of a triangular configuration.

Masses and shafts can be composed of any number of materials. In some embodiments masses and shafts are composed of the same material. In other embodiments any of the shafts or masses can be composed of varying materials. Masses and shafts for example, can be composed of steel, aluminum alloys, rubber or hard plastics. The material composition of shafts can change according to the desired elasticity of each shaft. In some examples rubber is used for higher elasticity, in other examples steel is used for relatively lower elasticity. Different types of materials can be used to alter the deformation qualities of shafts.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description or claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a mass" includes two or more different masses. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle braking assembly with reduced squeal, comprising:
   a brake pad operative to apply a braking force to a brake rotor or drum, the brake pad being subject to vibration during braking; and
   a damper attached to the pad, configured to force a squeal reducing vibration in the brake pad, the damper including:
   (i) a first mass;
   (ii) a second mass connected to the first mass by a first shaft; and
   (iii) a third mass connected to the first mass by a second shaft;
   wherein the damper includes a notch in at least one of the first shaft and second shaft.

2. The braking assembly of claim 1, wherein the damper is attached to an inner surface of the braking pad.

3. The braking assembly of claim 1, wherein the damper is symmetrical along a longitudinal axis.

4. The braking assembly of claim 1, wherein the damper is asymmetrical along a longitudinal axis.

5. A method of manufacturing a brake assembly configured to reduce noise during braking, comprising:
   providing a brake pad;
   forming a rotor or drum configured to interact with the brake pad;
   determining an in-plane mode of vibration for at least one of the rotor, drum and brake pad;
   identifying an out-of-plane mode of vibration for at least one of the rotor, drum and brake pad;
   attaching a damper to the brake pad to split a mode of vibration for the brake pad into the in-plane mode of vibration and the out-of-plane mode of vibration during braking;
   forming the damper to include at least three masses connected by shafts extending between at least two masses; and
   notching at least one shaft in a manner to increase vibration of at least one of the masses during braking.

6. The method of claim 5, further comprising:
   incorporating another damper in the rotor; and
   rotationally balancing the dampers with respect to the rotor.

7. The method of claim 6, further comprising:
   attaching the dampers to the rotor in diametrically opposed locations with respect to the rotor.

\* \* \* \* \*